United States Patent
Wallace et al.

(10) Patent No.: US 8,186,177 B2
(45) Date of Patent: May 29, 2012

(54) SYSTEMS FOR REDUCING COOLING WATER AND POWER CONSUMPTION IN GASIFICATION SYSTEMS AND METHODS OF ASSEMBLING SUCH SYSTEMS

(75) Inventors: Paul Steven Wallace, Katy, TX (US); James Michael Storey, Houston, TX (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 769 days.

(21) Appl. No.: 12/349,366

(22) Filed: Jan. 6, 2009

(65) Prior Publication Data
US 2010/0170285 A1   Jul. 8, 2010

(51) Int. Cl.
*F25D 9/00* (2006.01)

(52) U.S. Cl. ............................... 62/401; 62/406

(58) Field of Classification Search ........... 62/401, 62/404, 406, 314, 14, 419, 275; 60/643, 60/39.06, 39.182, 39.02; 29/700
See application file for complete search history.

(56) References Cited

U.S. PATENT DOCUMENTS

| | | | | |
|---|---|---|---|---|
| 4,212,160 A * | 7/1980 | Blaskowski | ................. | 60/39.12 |
| 4,571,935 A * | 2/1986 | Rice | ................. | 60/775 |
| 5,081,845 A * | 1/1992 | Allam et al. | ................. | 62/646 |
| 5,160,096 A * | 11/1992 | Perkins et al. | ................. | 60/775 |
| 5,345,756 A | 9/1994 | Jahnke et al. | | |
| 5,388,395 A * | 2/1995 | Scharpf et al. | ................. | 60/781 |
| 5,517,815 A * | 5/1996 | Fujioka et al. | ................. | 60/39.12 |
| 5,688,296 A | 11/1997 | Andrus, Jr. et al. | | |
| 6,247,301 B1 * | 6/2001 | Brannstrom et al. | ................. | 60/39.12 |
| 6,263,659 B1 | 7/2001 | Dillon, IV et al. | | |
| 6,824,575 B1 | 11/2004 | Otomo et al. | | |
| 7,451,591 B2 * | 11/2008 | Wakefield et al. | ................. | 60/39.464 |
| 2001/0001171 A1 * | 5/2001 | Onoda et al. | ................. | 60/39.06 |
| 2005/0150820 A1 | 7/2005 | Guo | | |
| 2006/0106119 A1 | 5/2006 | Guo et al. | | |
| 2006/0248872 A1 * | 11/2006 | Bachovchin et al. | ................. | 60/39.12 |
| 2007/0033918 A1 * | 2/2007 | Benz et al. | ................. | 60/39.12 |
| 2007/0033943 A1 * | 2/2007 | Benz et al. | ................. | 60/772 |
| 2007/0125064 A1 * | 6/2007 | Sonoda et al. | ................. | 60/39.182 |
| 2007/0254966 A1 | 11/2007 | Eskin et al. | | |
| 2008/0087022 A1 | 4/2008 | Briesch et al. | | |

FOREIGN PATENT DOCUMENTS

DE   19940763 A   3/2000
WO   2008014481 A1   1/2008

OTHER PUBLICATIONS

International Prior Art Report issued in connection with corresponding PL Application No. 389909 on Jan. 1, 2010.

* cited by examiner

*Primary Examiner* — Mohammad Ali
(74) *Attorney, Agent, or Firm* — Armstrong Teasdale LLP

(57) ABSTRACT

An integrated gasification combined cycle system is provided. The integrated gasification combined cycle system includes an air compressor coupled in flow communication to an air separation unit, a condensate heater coupled in flow communication with the air compressor, and a condenser coupled in flow communication with the condensate heater. The condensate heater and the air compressor are coupled such that a portion of compressed air generated by the air compressor is channeled to the condensate heater. A method of assembling an integrated gasification combined cycle system is also provided.

16 Claims, 2 Drawing Sheets

SYSTEMS FOR REDUCING COOLING WATER AND POWER CONSUMPTION IN GASIFICATION SYSTEMS AND METHODS OF ASSEMBLING SUCH SYSTEMS

BACKGROUND OF THE INVENTION

This invention relates generally to integrated gasification combined-cycle (IGCC) power generation systems, and more particularly to methods and systems for reducing cooling water and power consumption in gasification systems.

At least some known IGCC systems include at least one power producing gas and/or steam turbine system that is integrated with a gasification system such as, but not limited to, a carbon-to-liquids gasification system. Such known carbon-to-liquids gasification systems may include a coal-to-liquids (CTL) gasification system. At least some known CTL gasification systems include an air separation unit, a gasifier, and a Fisher-Tropsch (F-T) synthesis reaction system.

Known air separation units may include an integrated air compressor such as, but not limited to, a multi-stage air compressor including a plurality of stages. Known multi-stage air compressors typically include a series of cooling water exchangers that are disposed between adjacent compressor stages to provide inter-cooling to the compressed air and to remove heat generated as the air is compressed. To reduce the overall temperature of the compressed air to a desired temperature, such as a close-to-ambient temperature, a larger cooling water duty than is typically available may be required. As such, some known gasification systems may not be optimal for water-constrained sites.

Known gasifiers and F-T synthesis reaction systems generally produce a significant amount of by-product steam generated through reactions occurring within the systems. Although most of the steam produced is low-pressure steam, the steam may be channeled through a steam condensing cycle that includes a condenser to transform water vapor into a liquid condensate, which may be used, for example, as boiler feedwater. However, to remove a substantial amount of heat, known condensers may require a larger cooling water duty than is available. As such, at least some known gasification systems may not be optimal for water-constrained sites.

BRIEF DESCRIPTION OF THE INVENTION

A method of assembling an integrated gasification combined cycle system is provided. The method includes coupling an air compressor in flow communication with an air separation unit, coupling a condensate heater in flow communication with the air compressor, and coupling a condenser in flow communication with the condensate heater. The condensate heater and the air compressor are coupled such that a portion of compressed air generated by the air compressor is channeled to the condensate heater.

An integrated gasification combined cycle system is provided. The integrated gasification combined cycle system includes an air compressor coupled in flow communication to an air separation unit, a condensate heater coupled in flow communication with the air compressor, and a condenser coupled in flow communication with the condensate heater. The condensate heater and the air compressor are coupled such that a portion of compressed air generated by the air compressor is channeled to the condensate heater.

A carbon-to-liquids system is provided. The carbon-to-liquids system includes an air compressor coupled in flow communication to an air separation unit, a condensate heater coupled in flow communication with the air compressor, and a condenser coupled in flow communication with the condensate heater. The condensate heater and the air compressor are coupled such that a portion of compressed air generated by the air compressor is channeled to the condensate heater.

DETAILED DESCRIPTION OF THE INVENTION

Figure 1:
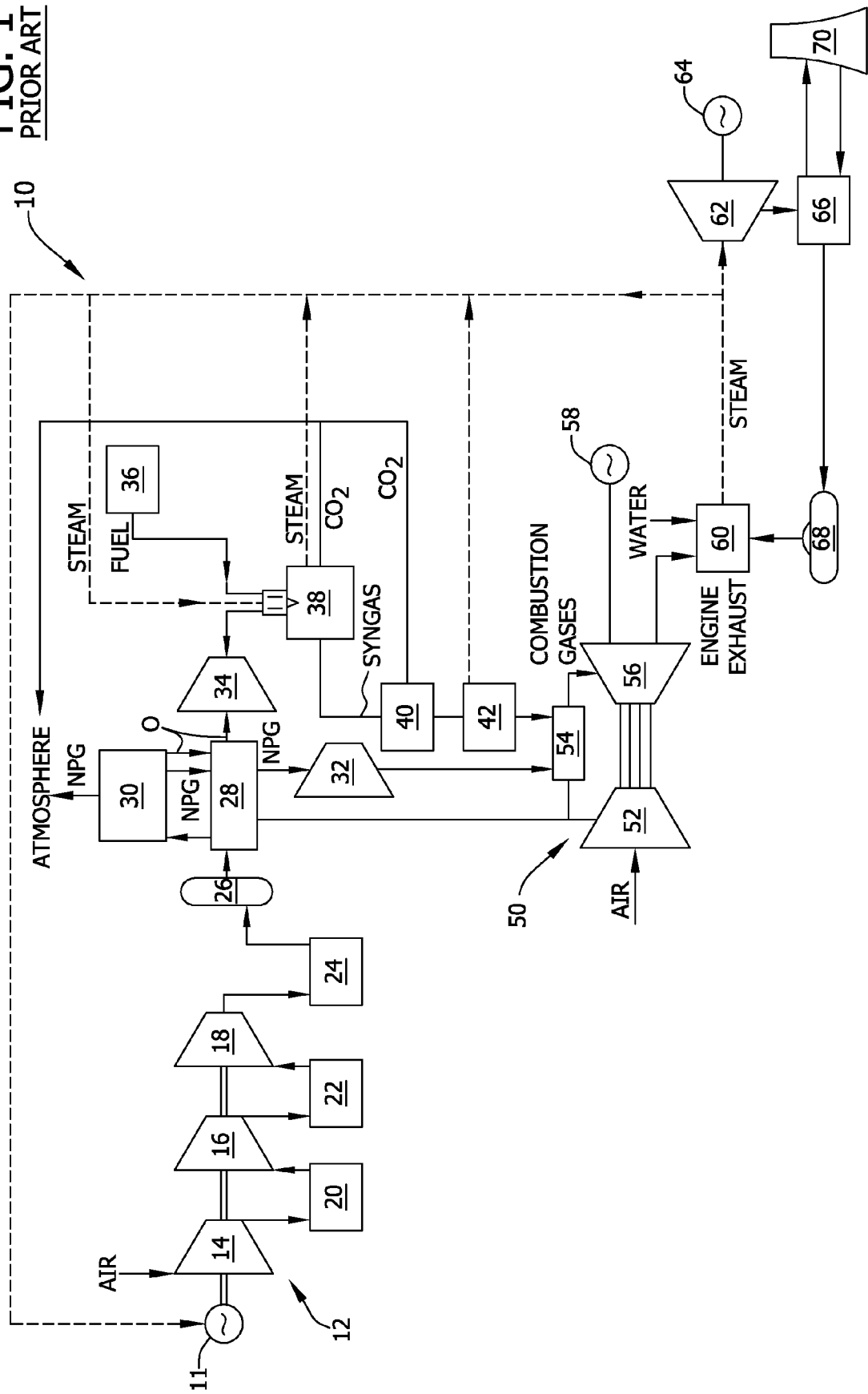
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 10. IGCC system 10 generally includes a power source 11, a main air compressor 12, an air separation unit 30, a gasifier 38, a gas turbine engine 50, a Fisher-Tropsch (F-T) synthesis reaction system 42, a gas turbine engine 50, a heat recovery steam generator (HRSG) boiler 60, a steam turbine 62, a condenser 66, and a deaerator 68. These components of IGCC system 10 are described below in more detail.

During operation, power source 11 provides power to main air compressor 12 that is coupled in flow communication with power source 11. In the exemplary embodiment, main air compressor 12 is a multi-stage compressor that includes a plurality of stages 14, 16, and 18. Cooling water exchangers 20 and 22 are provided between adjacent stages 14, 16, and 18, and cooling water exchanger 24 is provided after stage 18. During operation, in an attempt to remove condensed water from ambient air, stages 14, 16, and 18 compress ambient air. The air is heated and then subsequently channeled to cooling water exchangers 20, 22, and 24 that facilitate inter-cooling compressed air discharged from each respective stage 14, 16, and 18. Specifically, a cooling water duty is required to supply a flow of cooling water through cooling water exchangers 20, 22, and 24. However, to remove a substantial amount of heat, the cooling water duty required for IGCC system 10 may be greater than an amount of cooling water that is available for some water-constrained sites.

During operation, the compressed air may be channeled to dryers 26 that are coupled in flow communication with main air compressor 12. Dryers 26 attempt to remove water vapor and $CO_2$ from the compressed air, which may freeze and/or cause unwanted deposits to be induced in known air separation units (described later in more detail) coupled downstream from dryers 26. The dry, $CO_2$-free compressed air may then be channeled to a main heat exchanger 28.

In the exemplary embodiment, main heat exchanger 28 attempts to cool the compressed air to significantly lower temperatures, e.g., approximately −300° F. or −185° C., as compared to compressed air temperatures in dryers 26. More specifically, cooling may be induced by channeling gaseous products and/or waste gas streams created by an air separation process (described later in more detail) through main heat exchanger 28. Because temperatures of the gaseous products and waste gas streams are generally lower than the temperature of the compressed air flowing through main heat exchanger 28, the compressed air operating temperature may be reduced prior to the air being channeled to air separation unit 30. In some embodiments, in addition to or in the alternative to compressed airflow being channeled from main air compressor 12, compressed air may be channeled, directly to and/or indirectly to main heat exchanger 28, from a gas turbine engine compressor (described later in more detail) to air separation unit 30.

In the exemplary embodiment, air separation unit 30, also known as a cold box or a distillation column, is coupled in flow communication with main heat exchanger 28. Air separation unit 30 uses the compressed air to generate oxygen for subsequent production of synthetic gas. More specifically, within air separation unit 30, the compressed air is subjected to lower temperatures as compared to main heat exchanger 28 and the compressed air is separated into separate flows of oxygen and a gas by-product, sometimes referred to as a "process gas". The process gas generated by air separation unit 30 includes nitrogen and will be referred to herein as nitrogen process gas (NPG). The NPG may also include other gases such as, but not limited to, oxygen and/or argon. For example, in some embodiments, the NPG includes between about 95% and about 100% nitrogen. At least some of the NPG flow is vented to the atmosphere.

In IGCC system 10, the NPG may be channeled to compressor 32 if the NPG is to be fed to a downstream gas turbine engine, and/or the NPG may be channeled to compressor 34 depending on an operating pressure of gasifier 38. In each case, cooling water is channeled through cooling water exchangers (not shown) associated with the respective compressors 32 and 34 to facilitate removing a substantial amount of heat created by such compression. As such, additional demand may be imposed on the cooling water duty required for IGCC system 10 to an overall demand level that is greater than is available for some water-constrained sites.

In the exemplary embodiment, gasifier 38 is coupled to air separation unit 30. During operation, in addition to the oxygen flow that is used as a gasifying agent, gasifier 38 receives fuel such as, but not limited to, non-petroleum resources such as coal and/or other carbon-based feedstock supplied by a fuel source 36 to generate partially combusted synthetic gases, referred to herein as "syngas" for use by gas turbine engine 50 as fuel, as described below in more detail. It should be appreciated that, in some known IGCC systems, gasifier 38 may use any fuel such as petroleum coke, residual oil, oil emulsions, tar sands, and/or other similar fuels. In IGCC system 10, the gasification reaction used to produce syngas may also produce carbon dioxide ($CO_2$) that may be vented to the atmosphere, sequestered for storage, and/or processed for use as an industrial use gas. Also, in some embodiments, steam from the gasification reaction may be used to generate electricity and/or may be channeled to power source 11 to generate power for main air compressor 12. It should be appreciated that power source 11 may include a steam generator, an electric motor, and/or any power generating system.

In the exemplary embodiment, the syngas generated by gasifier 38 is cleaned in a clean-up device 40, and $CO_2$ may be separated from the syngas during clean-up. In some known IGCC systems, the $CO_2$ is vented to the atmosphere, sequestered for storage, and/or processed for use as an industrial use gas. The cleaned syngas may then be channeled to other systems for further processing such as, but not limited to, F-T synthesis reaction system 42 that is coupled in flow communication with clean-up device 40 to facilitate converting the cleaned syngas to liquid hydrocarbons. In some embodiments, steam generated by the F-T synthesis reaction may be used to generate electricity and/or may be channeled to power source 11 to generate power for main air compressor 12.

The converted liquid hydrocarbons are supplied as fuel to gas turbine engine 50 that is coupled in flow communication with F-T synthesis reaction system 42. More specifically, gas turbine engine 50 includes a gas turbine compressor 52, a combustor 54, and a gas turbine 56. Compressor 52 channels compressed air to combustor 54 which is mixed with the liquid hydrocarbon fuel and combusted in F-T synthesis reaction system 42. The resulting combustion gases are channeled to gas turbine 56 to drive a generator 58 that supplies electrical power to a power grid (not shown). Exhaust gases from gas turbine 56 are channeled to HRSG boiler 60 that generates steam for driving steam turbine 62 that is coupled in flow communication with HRSG boiler 60.

In IGCC system 10, power generated by steam turbine 62 may drive an electrical generator 64 that provides electrical power to the power grid. In some embodiments, in addition to or in the alternative to electrical generator 64, steam turbine 62 may be coupled in flow communication to a water cooled condenser 66 and/or a deaerator 68 to supply water to HRSG boiler 60. More specifically, condenser 66 uses steam from steam turbine 62 to transform water vapor into a liquid condensate. The resultant condensate is channeled to deaerator 68 that removes dissolved gases from the liquid condensate such that the liquid condensate is transformed into a non-corrosive water that is supplied as feedwater to HRSG boiler 60 for use in producing steam. Because cooling water from a cooling water source, such as cooling tower 70, may be required to condense the steam in condenser 62, the cooling water duty required for IGCC system 10 may be increased to an overall demand level that is greater than is available for some water-constrained sites.

Figure 2:
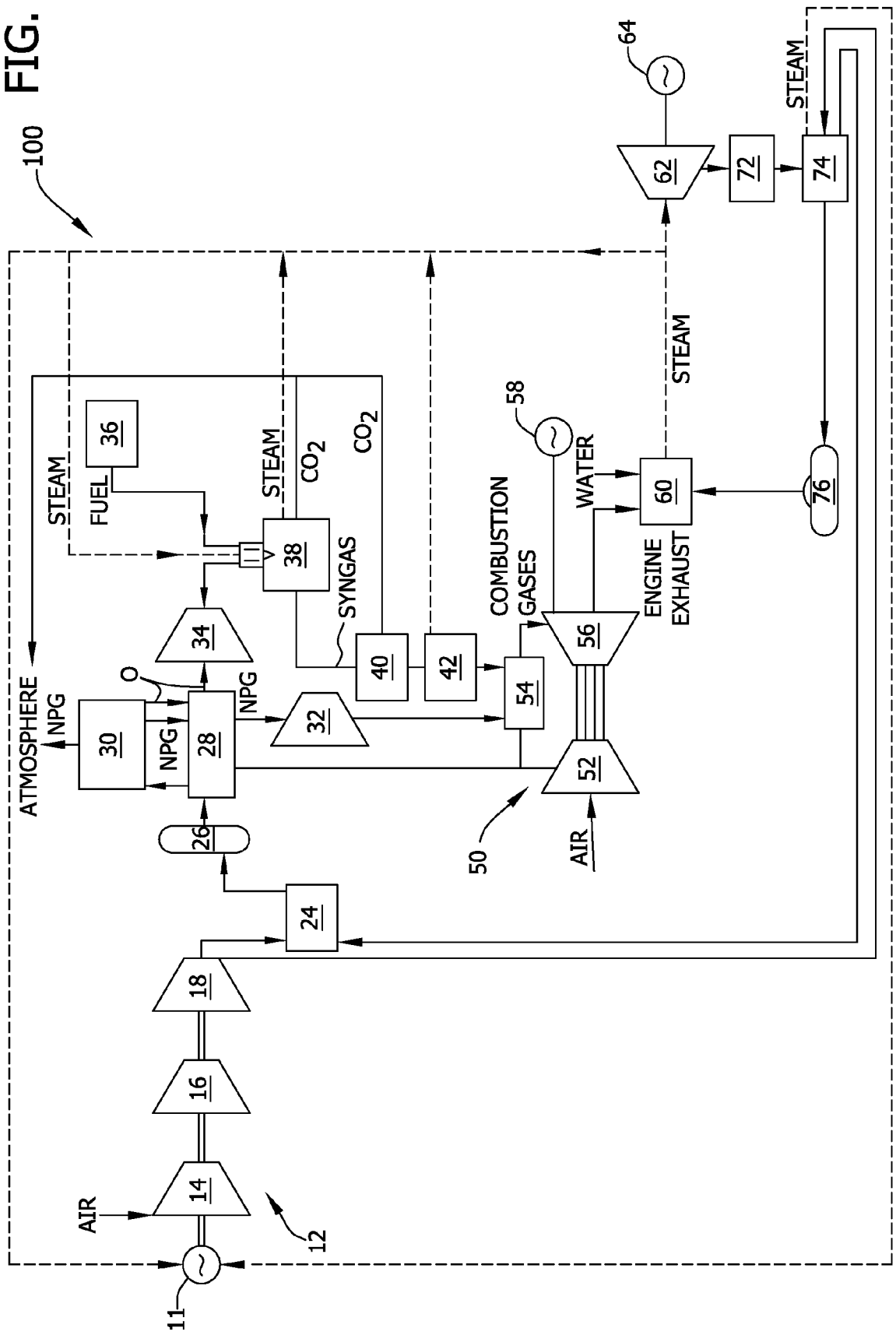
FIG. 2 is a schematic diagram of an exemplary IGCC system.

FIG. 2 is a schematic diagram of an exemplary integrated gasification combined-cycle (IGCC) power generation system 100. Specifically, the IGCC system 100 shown in FIG. 2 is substantially similar to IGCC system shown in FIG. 1, and components in FIG. 2 that are identical to components illustrated in FIG. 1 are identified in FIG. 2 using the same reference numerals used in FIG. 1. More specifically, in the embodiment illustrated in FIG. 2, IGCC system 100 includes an airfan condenser 72 and main air compressor 12 that are coupled to a heater 74 to facilitate reducing cooling water consumption as compared to known IGCC systems.

In the exemplary embodiment, IGCC system 100 includes multi-stage main air compressor 12 and air is compressed by stages 14, 16, and 18. As the air is compressed within compressor 12, the temperature of the air is increased. For example, in one embodiment, the air may be heated to a temperature of between approximately 750-800° F. The heated compressed air is then separated into two compressed airflow streams, described in more detail below.

During operation, a portion of the compressed air is channeled in a first compressed air stream to cooling water exchanger 24 that facilitates cooling the compressed air heated within compressor 12. Subsequently, the compressed air is channeled from exchanger 24 to air separation unit 30 via dryers 26 and main heat exchanger 28. Nitrogen separated from the air is channeled to combustor 54, and oxygen separated from the air is channeled to gasifier 38 to react with fuel to produce syngas. The syngas may be cleaned in clean-up device 40 and then channeled to F-T synthesis reaction system 42 for further processing and to convert the cleaned syngas to liquid hydrocarbons for use in gas turbine engine 50. Exhaust gases from gas turbine 56 are supplied to HRSG boiler 60 to generate steam for driving steam turbine 62.

In the exemplary embodiment, steam from turbine 62 is used to power main air compressor 12 during operation. More specifically, IGCC system 100 includes airfan condenser 72 that condenses the steam into a liquid condensate. Airfan condenser 72 uses cooling air to facilitate removing latent heat from the steam during the condensing process. The liquid condensate is then pre-heated in heater 74 and channeled to a deaerator 76 to remove dissolved gases from the liquid condensate such that liquid condensate is transformed into a non-corrosive water that is channeled as feedwater to HRSG boiler 60 for use in producing steam. As a result of pre-heating the liquid condensate, steam may be generated within heater 74. In the exemplary embodiment, steam from heater 74 may be used to generate electricity and/or may be channeled to power source 11 to generate power for main air compressor 12.

During operation, a portion of compressed air is channeled from main air compressor stage 18 to heater 74 in a second compressed air stream. The hot compressed air increases the operating temperature of the liquid condensate channeled to heater 74 from airfan condenser 72. Thereafter, the hot compressed air is channeled into air separation unit 30 via cooling water exchanger 24 such that the overall operating temperature of the compressed air is reduced to a close-to-ambient temperature. It should be appreciated that IGCC system 100 may include a separate cooling water exchanger in addition to cooling water exchanger 24. In such an embodiment, the additional cooling water exchanger is coupled downstream of heater 74 to facilitate cooling the pressurized air to a near-ambient temperature. Alternatively, heated NPG is channeled from compressor 32 and/or 34 to heater 74 to generate low pressure (LP) steam and to cool the NPG prior to injection in gas turbine 50. In such an embodiment, the need for cooling water of the NPG stream is facilitated to be lessened or eliminated depending on the application.

In the exemplary embodiment, IGCC system 100 includes two compressed airflow streams that are channeled from main air compressor 12. A portion of the compressed air is initially channeled to cooling water exchanger 24, and remaining compressed air is initially channeled to heater 74. Because a portion of the compressed air discharged from main air compressor stage 18 is diverted to heater 74, the initial amount of compressed air channeled from main air compressor stage 18 to cooling water exchanger 24 is less than an overall amount of compressed air that is channeled from main air compressor stage 18 to cooling water exchanger 24 in known IGCC systems, such as IGCC system 10 (shown in FIG. 1). Moreover, because a portion of compressed air is diverted to heater 74, heat transfer within heater 74 causes compressed air channeled to cooling water exchanger 24 to be at lower operating temperatures as would be possible without the use of heater 74. As such, IGCC system 100 may operate with less cooling water exchangers, and/or less cooling water to remove heat generated in main air compressor 12, as compared to known IGCC systems. For example, the cooling water requirements of IGCC system 100 may be as much as 20% less than the cooling water requirements of known IGCC systems.

As described above, liquid condensate generated by airfan condenser 72 is heated by heater 74 using a portion of hot compressed air channeled from main air compressor stage 18. Because IGCC system 100 consumes steam and preheats the liquid condensate using a portion of the heat of compression, IGCC system 100 facilitates reducing condensate integration requirements. Moreover, the steam generated from heating the liquid condensate may be used to generate electricity and/or to power main air compressor 12. Furthermore, the steam generated from heating the liquid condensate facilitates reducing IGCC system 100 power consumption and/or facilitates reducing IGCC power generation requirements.

The exemplary methods of assembling IGCC system 100 are described above. More specifically, the methods include coupling main air compressor 12 in flow communication with an air separation unit 30, coupling condensate heater 74 in flow communication with main air compressor 12, and coupling airfan condenser 72 in flow communication with condensate heater 74. Condensate heater 74 and main air compressor 12 are coupled such that a portion of compressed air generated by main air compressor 12 is channeled to condensate heater 74.

The above-described exemplary IGCC systems and methods of assembling such system facilitate reducing cooling water consumption. Moreover, above-described IGCC systems facilitate reducing cooling water consumption to cool compressed air by diverting a portion of compressed air from a compressor to a heater. Further, above-described IGCC systems facilitate reducing cooling water consumption to condense steam by providing an airfan condenser. Therefore, the cooling water requirements of IGCC system 100 may be as much as 20% less than the cooling water requirements of known IGCC systems. Also, above-described IGCC systems facilitates reducing power consumption and/or facilitates reducing power generation because the steam generated from heating liquid condensate flowing through the heater may be used to generate electricity and/or to power system components.

Exemplary embodiments of method and systems for reducing cooling water and power consumption in gasification systems are described in detail above. The methods and systems are not limited to use with the specific IGCC systems described herein, but rather, the systems and methods can be utilized independently and separately from other system components described herein. Moreover, the invention is not limited to the embodiments of the methods and systems described above in detail. Rather, other variations of the methods and systems may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling an integrated gasification combined cycle system, said method comprising:
coupling at least one stage of an air compressor in flow communication with an air separation unit, such that a first portion of compressed air is channeled to the air separation unit and such that a second portion of compressed air is channeled to a condensate heater coupled in flow communication with the air compressor; and
coupling a condenser in flow communication with the condensate heater, wherein condensed steam is channeled to the condensate heater and at least a portion of heat in the second portion of compressed air is transferred to condensed steam in the condensate heater to facilitate steam generation.

2. The method in accordance with claim 1 further comprising coupling a deaerator with the condensate heater such that the deaerator facilitates removing dissolved gases from heated condensate discharged from the condensate heater.

3. The method in accordance with claim 1 further comprising coupling a cooling water exchanger with the condensate heater such that the cooling water exchanger facilitates cooling the second portion of compressed air discharged from the condensate heater.

4. The method in accordance with claim 1 further comprising coupling a power source in flow communication with the condensate heater such that the power source facilitates generating power from the steam to drive the air compressor.

5. The method in accordance with claim 1 wherein the condensate heater and the air separation unit are coupled such that the second portion of compressed air is channeled to the air separation unit.

6. An integrated gasification combined cycle system comprising:
- at least one stage of an air compressor coupled in flow communication with an air separation unit via a first conduit configured to channel a first compressed air stream;
- a condensate heater coupled in flow communication with said at least one stage of said air compressor via a second conduit configured to channel a second compressed air stream; and
- a condenser coupled in flow communication with said condensate heater, such that at least a portion of heat in the second compressed air stream is transferred to condensed steam in the condensate heater to facilitate steam generation.

7. The integrated gasification combined cycle system in accordance with claim 6 further comprising a deaerator coupled with said condensate heater such that said deaerator facilitates removing dissolved gases from heated condensate discharged from the condensate heater.

8. The integrated gasification combined cycle system in accordance with claim 6 further comprising a cooling water exchanger coupled with said condensate heater such that said cooling water exchanger facilitates cooling said second compressed air stream discharged from said condensate heater.

9. The integrated gasification combined cycle system in accordance with claim 6 wherein said condenser is an airfan condenser.

10. The integrated gasification combined cycle system in accordance with claim 9 further comprising a power source coupled in flow communication with said condensate heater such that the power source facilitates generating power from the steam to drive said air compressor.

11. The integrated gasification combined cycle system in accordance with claim 6 wherein said air compressor and said air separation unit are coupled such that said second compressed air stream is channeled to said air separation unit.

12. A carbon-to-liquids system comprising:
- at least one stage of an air compressor coupled in flow communication with an air separation unit via a first conduit configured to channel a first compressed air stream;
- a condensate heater coupled in flow communication with said at least one stage of said air compressor via a second conduit configured to channel a second compressed air stream; and
- a condenser coupled in flow communication with said condensate heater such that at least a portion of heat in the second compressed air stream is transferred to condensed steam in the condensate heater to facilitate steam generation.

13. The carbon-to-liquids system in accordance with claim 12 further comprising a deaerator coupled with said condensate heater such that said deaerator facilitates removing dissolved gases from heated condensate discharged from the condensate heater.

14. The carbon-to-liquids system in accordance with claim 12 further comprising a cooling water exchanger coupled with said condensate heater such that said cooling water exchanger facilitates cooling said second compressed air stream discharged from said condensate heater.

15. The carbon-to-liquids system in accordance with claim 12 wherein said condenser is an airfan condenser.

16. The carbon-to-liquids system in accordance with claim 15 further comprising a power source coupled in flow communication with said condensate heater such that the power source facilitates generating power from the steam to drive said air compressor.

* * * * *